June 30, 1931.  P. GOLDACKER  1,811,926

PHOTOGRAPHIC ROLL FILM SPOOL

Filed Nov. 30, 1928

Patented June 30, 1931

1,811,926

UNITED STATES PATENT OFFICE

PAUL GOLDACKER, OF BERLIN-TREPTOW, GERMANY, ASSIGNOR TO AGFA ANSCO CORPORATION, OF BINGHAMTON, NEW YORK, A CORPORATION OF NEW YORK

PHOTOGRAPHIC ROLL FILM SPOOL

Application filed November 30, 1928, Serial No. 322,830, and in Germany December 16, 1927.

The present invention relates to photographic roll film spools, more particularly to roll film-spools having a cylindrical sheet metal core. The object of this invention is to form the exit slot of the core in such a manner as to facilitate threading of the paper strip.

The photographic roll film spools with a core of sheet metal, which are commonly used, give rise to certain difficulties in the threading of the strips of protecting paper, owing to the end of the strip coming into contact with the inner wall of the core, so that it can not be directly guided through the exit slot.

Now I have found that these difficulties are easily overcome, when the spool core has two oppositely placed longitudinal slots, of which one, the entrance slot, extends throughout approximately the whole length of the core and is so narrow that the paper strip is kept straight, as it is introduced through the slot. The opposite exit slot is, on the other hand, so wide, that, even when the paper strip does not lie exactly on the diameter extending through the slots, it is sure to pass through the exit slot. Advantageously this second slot does not extend along the whole length of the core.

Figure 1:
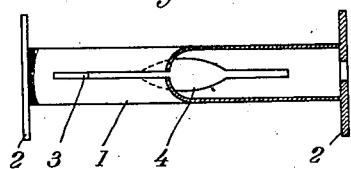
Figure 2:
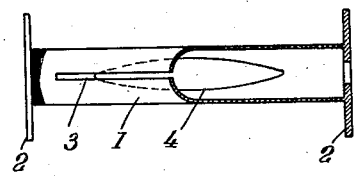

In the accompanying drawings, the two figures show respectively two forms of the invention, the left hand side of each figure giving a side view, and the right hand side being cut away to give a sectional view. The core 1 carries the end flanges 2 and has a narrow slot 3 which extends along the whole length of the core and a second slot 4 opposite the slot 3. The slot 4 may extend over a long or short portion of the core. In Fig. 1 the slot 4 is comparatively short, in which case it is advisable to extend it, as indicated, by a narrow slot at each end. In Fig. 2 the slot 4 is of greater length.

I claim:

1. A photographic roll film spool having a cylindrical sheet metal core, which core has two longitudinal slots placed opposite to each other, one of which is broader than the other.

2. A photographic roll film spool having a cylindrical sheet metal core, which core has two longitudinal slots placed opposite to each other, one of which is broader and shorter than the other.

3. A photographic roll film spool having a cylindrical sheet metal core, which core has two longitudinal slots placed opposite to each other, one of which is oval in form and is broader and shorter than the other.

In testimony whereof, I affix my signature.

PAUL GOLDACKER.